United States Patent

Hochreiter

[15] 3,646,864
[45] Mar. 7, 1972

[54] FLASHLAMP-SENSING AND PERCUSSIVE-FIRING MECHANISM FOR PHOTOGRAPHIC APPARATUS

[72] Inventor: William T. Hochreiter, Rochester, N.Y.
[73] Assignee: Eastman Kodak Company, Rochester, N.Y.
[22] Filed: Aug. 14, 1969
[21] Appl. No.: 850,007

[52] U.S. Cl. .................................95/11.5 R, 95/11 V
[51] Int. Cl. ................G03b 9/70, G03b 13/02, G03b 17/20
[58] Field of Search...............95/11.5, 11, 11 V; 240/1.3, 240/2 C; 431/92, 93

[56] References Cited

UNITED STATES PATENTS 590,204    9/1897    Blackmore...............................95/11.5

Primary Examiner—Samuel S. Matthews
Assistant Examiner—Robert P. Greiner
Attorney—Robert W. Hampton and J. Addison Mathews

[57] ABSTRACT

An improved photographic mechanism for mechanically sensing and firing a percussive flashlamp device is actuatable and resetable by the camera body release or shutter actuator and without requiring additional setting force upon film winding. The flashlamp device includes a preenergized striker, and the mechanism includes a sensing and actuating member movable into a first distinct position in engagement with the striker to sense the condition of the flashlamp. To fire the lamp, the sensing and actuating member is rapidly moved to a second and striker-dislodging position by a hammer or driver. Movement of the sensing and actuating member to such first and second positions is effected by depression of the camera body release or shutter actuator, and return movement thereof effects both retraction of the member and resetting or positioning of the hammer or driver. The mechanism also may be provided with one or more lamps or other indicating means for presenting an output or signal indicative of the sensed condition of the flashlamp or position of the preenergized striker.

7 Claims, 8 Drawing Figures

WILLIAM T. HOCHREITER
INVENTOR.

BY
ATTORNEYS

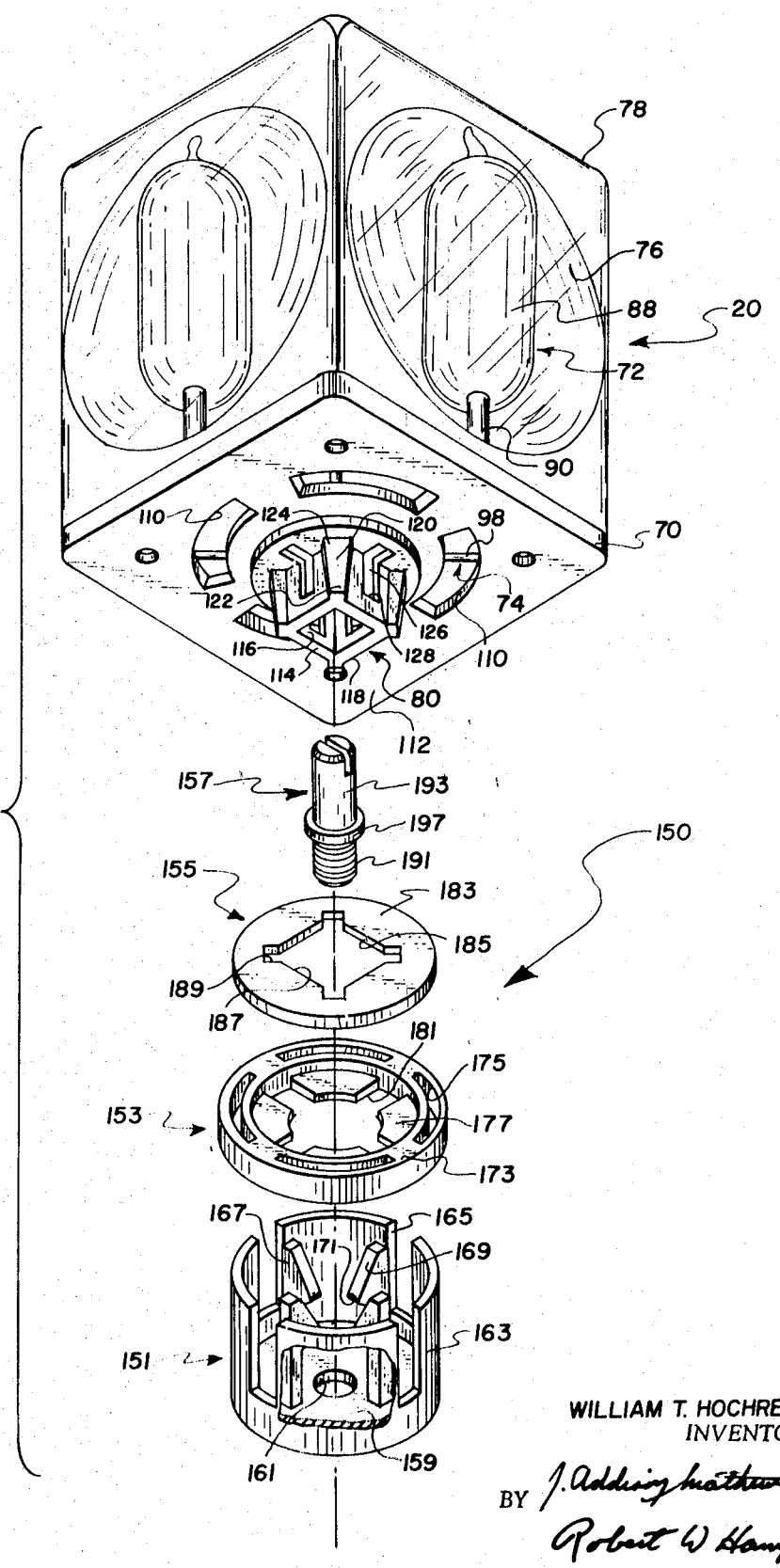

WILLIAM T. HOCHREITER
INVENTOR.

BY J. Addingmatto
Robert W Hampton
ATTORNEYS

FLASHLAMP-SENSING AND PERCUSSIVE-FIRING MECHANISM FOR PHOTOGRAPHIC APPARATUS

BACKGROUND OF THE INVENTION

The present invention relates to photographic apparatus useable with mechanically fireable flash devices, and more particularly to cameras adapted to detachably support and percussively fire flashlamps in multilamp flash units or flashcubes having dislodgable preenergized strikers.

It is well known in the photographic art to provide cameras and photographic attachments with a built-in artificial light source or flashlamp, and to electrically fire the lamps in synchronism with operation of a camera shutter to properly expose film in the camera under low scene light conditions. It is also known in such electrical firing devices to provide electrical means, as disclosed for example in commonly assigned U.S. Pat. No. 3,383,995, entitled Bulb Sensing Means, and issued on May 21, 1968 in the name of Richard J. Bresson, for sensing the operative or inoperative condition of a flashlamp preparatory to firing thereof.

More recently, percussively ignitable flashlamps or flashlamp devices have been developed that include a percussion sensitive primer material ignitable by an impacting or mechanical force to fire the lamp. In the preferred embodiment of such devices, a plurality of flashlamps are contained in a multilamp unit or flashcube provided with a striker member or wire for each flashlamp. The striker is maintained in a preenergized or tensioned position, spaced from its respective flashlamp, and is dislodgable or releasable to rapidly impact and fire such lamp.

As illustrated and described in commonly assigned copending U.S. applications, Ser. No. 767,145, entitled Control, Signal And Actuating Mechanism For Use With Photoflash Lamp Units Having Preenergized strikers filed Oct. 14, 1968 in the name of Edward L. Sturm; and Ser. No. 850,701; entitled Flash Firing And Sensing Mechanism For Camera Or Attachment Adapted To Use Percussively Fireable Flashlamps, filed concurrently herewith in the names of William H. Horton and Chester W. Michatek, camera mechanisms have been provided also for sensing the condition of and firing these percussively ignitable or fireable flashlamps.

Previous devices for sensing and firing electrical or percussive flashlamps have been generally satisfactory for their intended purpose. However, at least in certain circumstances, each suffers from disadvantages. In regard to electrical systems, most of these disadvantages are well known, and a few are set forth in the previously mentioned Horton and Sturm application Ser. No. 850,701. In regard to mechanical systems, completely new and previously unknown problems have been generated. For example, and as described more fully in the aforementioned Horton and Sturm application, Ser. No. 850,701, it is likely that a mechanical sensing member will interfere with rotation of the multilamp unit or cube. While various mechanisms have been designed to overcome this problem, they generally are cocked or reset in response to film winding and therefore increase the force necessary to operate the film-winding assembly. Moreover, the increased film-winding force may be substantial, especially in those mechanisms which retract the actuating member from the cube by camming means on the cube socket or the cube itself. This is necessarily true because the limited amount of cube rotation requires relatively fast-acting camming surfaces having little or even a negative mechanical advantage. The same is true of the mechanism disclosed in the aforementioned Sturm application, Ser. No. 850,701, even though actuating member retraction is effected by the body release, since an additional impacting member is provided to fire the flashlamp and this impacting member is precocked or set by the film-winding mechanism.

SUMMARY OF THE INVENTION

It is, therefore, an object of the present invention to provide a flashlamp sensing and firing mechanism which is actuated and reset substantially entirely by the body release or shutter actuating member and which does not substantially increase the force necessary to operate the camera film-winding mechanism or the body release.

It is a further object of the invention to provide a sensing and actuating mechanism of the above type useable with flashlamps having preenergized strikers and which is movable first to a distinct sensing position in engagement with one of the strikers and then to a second position for dislodging or releasing the one striker, and A still further object of the present invention is to provide a mechanism of the above type having a mechanical sensing member for controlling one or more electrical signal means and for presenting a signal indicative of the operative or inoperative position of the striker.

In accordance with a preferred embodiment of the invention, a camera or attachment is provided with a mechanism for sensing and firing a percussively ignitable flashlamp device having a preenergized percussive striker and received in a multilamp unit or flashcube containing a plurality of such devices. The mechanism includes a sensing and actuating arm and an impacting member operable and resetable substantially entirely by return of the camera body release or shutter actuating mechanism and without requiring additional setting force upon operation of the film-winding mechanism, or substantial additional force to depress the body release. The arm has a retracted position prior to depression of the body release and is moved upon depression thereof first to a sensing position in engagement with the flashlamp striker and then to a second dislodging or release position for firing the flashlamp. However, if the forwardly facing flashlamp is inoperative because the striker is not energized, the arm, upon depression of the body release will move directly to its second position to effect a signal indicative of the inoperative flashlamp condition. Upon return of the body release to its initial position, the sensing and actuating arm and the impacting member each return to their preactuation or set positions.

BRIEF DESCRIPTION OF THE DRAWINGS

FIG. 2 is an exploded view of percussively ignitable flashlamps in a multilamp unit and a socket for receiving such a unit on the camera.

DESCRIPTION OF THE PREFERRED AND ILLUSTRATED EMBODIMENTS

Figure 1:
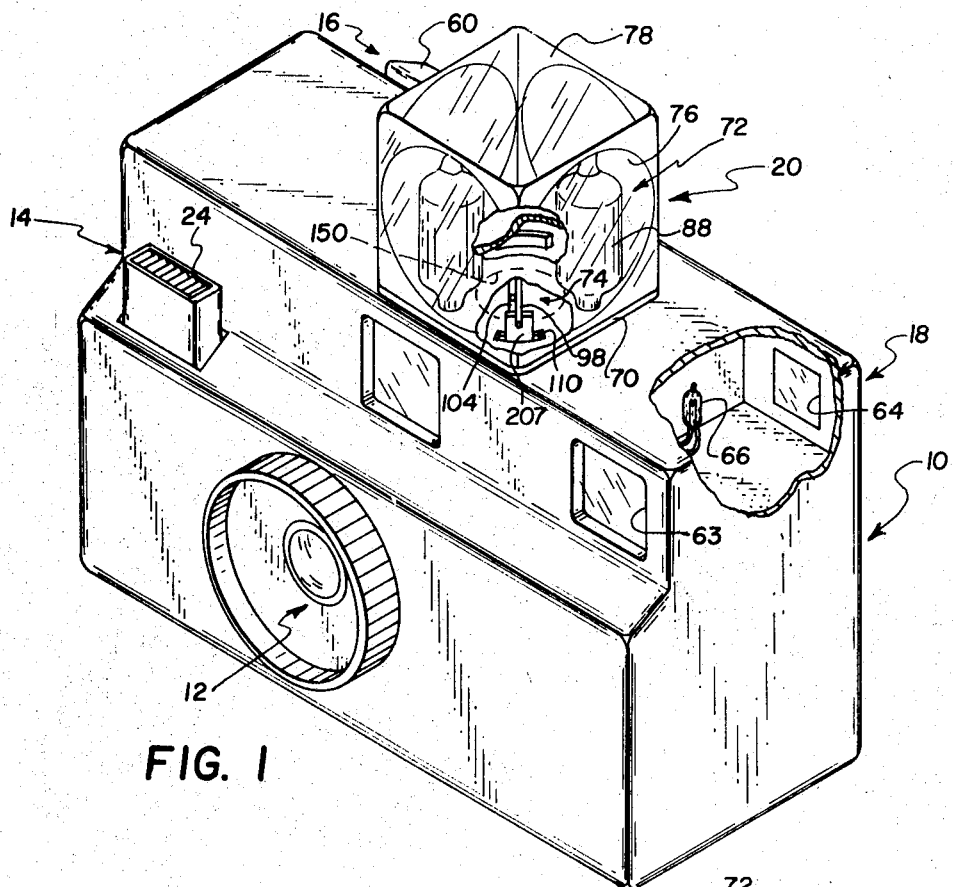
FIG. 1 is a perspective view of a camera incorporating the present invention and illustrates a preenergized percussively ignitable flashlamp device received on the camera, and a signal means in the camera viewfinder for indicating the condition of the received flashlamp.

Referring again to the drawings, and particularly to FIG. 1, a camera for incorporating a preferred embodiment of the invention is illustrated generally comprising a camera casing 10 supporting an objective 12, a shutter actuating means depicted as a body release or depression member 14, a film-advancing means or winding member 16 and a viewfinder 18. As will be described more fully hereinafter the camera is particularly adapted to receive a percussively ignitable flashcube 20 which is fireable synchronously with operation of the camera shutter by a mechanism 22 illustrated on FIG. 5.

Figure 5:
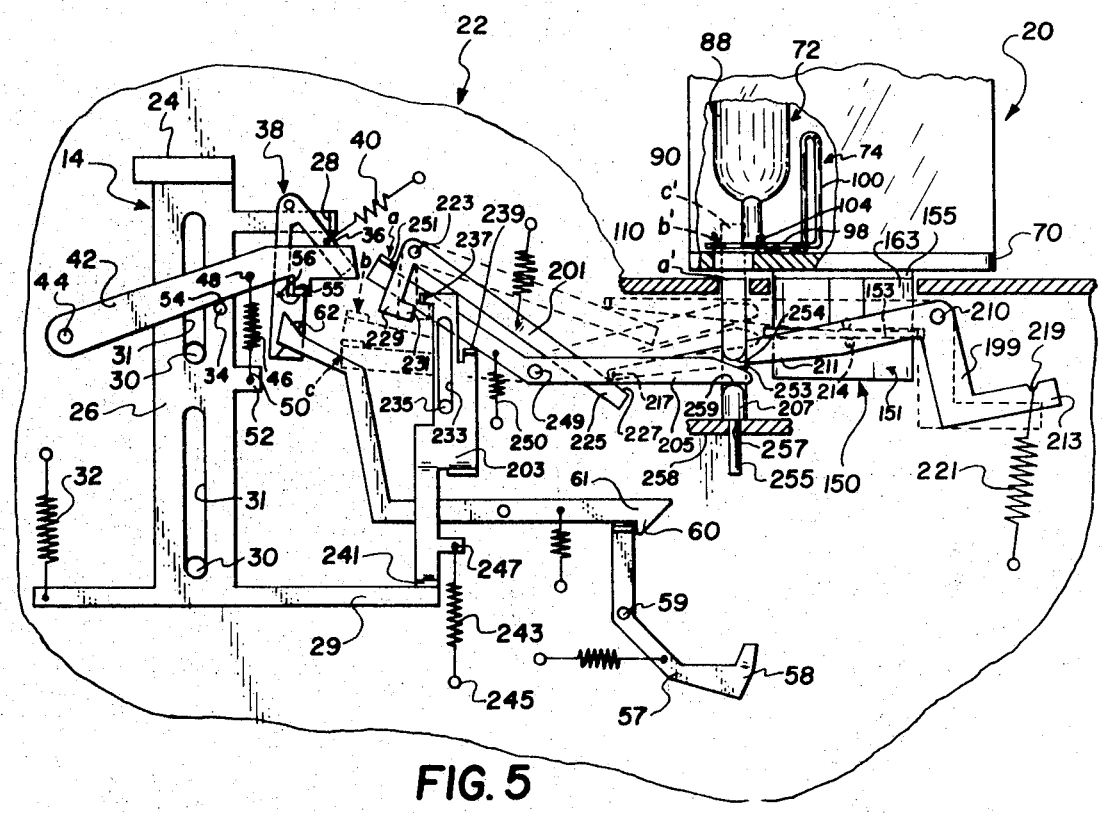
FIG. 5 is a schematic view of a flashlamp sensing and actuating mechanism in accordance with the present invention.

Body release or depression member 14 is most clearly illustrated in FIG. 5 and, in the preferred embodiment, comprises a portion accessible from the camera exterior, such as depression surface 24, and an elongated or body portion 26 including a stop or latching control arm or lug 28 and a slide control or abutment arm 29. The body portion 26 is mounted within the camera casing, for example by pin and slot means 30, 31, for movement in response to depression of body release 14 between a first or latching position for maintaining a driver or hammer member in a latched position, and a second energizing and releasing position for releasing the driver or hammer member to effect actuation of the shutter and various other camera mechanisms such as a flash firing member. The body release normally is maintained in the first position by a return or resilient means such as spring 32, and further includes a return member or resetting abutment or pin 34 for returning or resetting the driver or hammer member as will be described more fully hereinafter.

Associated with the body release, such as by an articulate coupling or camming leg 36, is a latching mechanism 38, which normally is held in a first blocking or latching position by spring 40 but which is movable by release control arm 28 to a second or releasing position. In its first position this latch maintains a hereinafter described driver or hammer member in a first set position, from which such member is releasable upon movement of body release 14 to its second position.

The driver or hammer member 42 is mounted within the camera by pin or stud 44 for movement between a first or set position and a second position. Rapid movement from the first to the second position is effected by resilient spring 46 coupled at one end 48 to the driver member and at the other end 50 to a portion 52 of the body release. Return or resetting movement of the driver to the first position is effected by the pin 34 on the body release, which engages a surface 54 of the driver member to urge the latter, under the action of spring 32, back toward the first position. When the body release 14 is in its first or raised position, and during an initial portion of its downward movement toward its second releasing position, the driver latching mechanism 38 maintains the driver member in the first or set position thereof by latching engagement between the mechanism and member surfaces 55 and 56, respectively. On further depression or actuation of the body release however, the control arm 28 thereon engages and pivots the latching mechanism to a releasing position disengaged from the driver, and thereby frees the driver for the aforementioned rapid actuating movement of the driver to the second or released position thereof. In order to permit easier depression of the body release, and easier return or resetting of both the body release and the driver 42, spring 46 normally is in a substantially relaxed condition and is tensioned or energized mainly by the initial downward movement of the body release.

The shutter or aperture closing means 57 preferably is of the spring driven type and includes at least one blade 58 mounted in the camera for pivotal movement about a stud 59, or other suitable means. The blade normally is maintained in a closed position by a lug 60 of a latching lever 61, and is released to uncover the aperture by movement of the latching lever 61 and lug 60 to a disengaged or unlatching position. Thereafter, and in properly timed relation, the aperture is closed by return of the blade, or by a second blade or other means (not shown). To open or release the shutter in response to depression of the body release, and either independently of or in synchronism with the firing of a flashlamp, a portion 62 of shutter latching lever 61 is positioned to be engaged by and upon release of the driver or hammer member 42. As the hammer member rapidly moves to its second position, as described above, it will strike the portion 62 of the latching lever 61 and will thereby drive or move the lever and its lug 60 to unlatch or release and actuate the shutter. Of course the shutter could be of the impact type and, in this case the member illustrated as shutter 57 could be a driver or impacting member for driving the shutter blade to open the shutter and expose film in the camera for a proper exposure period.

Winding mechanism 16 is more clearly disclosed in commonly assigned copending U.S. application, Ser. No. 850,125 entitled Firing Mechanism For Percussively Ignitable Flashlamps and filed concurrently herewith in the name of Edward L. Sturm. Briefly, however, the winding mechanism preferably comprises a handle or actuating member 63 (FIG. 1) engageable from the camera exterior and adapted to be coupled or connected to a film takeup spool, within a takeup chamber in the camera, for advancing or winding film in the usual manner. Within the camera the winding mechanism may include means (not shown) for recocking the shutter blade 54 and for indexing the flashcube socket in response to winding of the film. However, as will become more apparent hereinafter, the winding mechanism does not effect resetting of the driver or impacting member 42, nor does it effect retracting of the hereafter described sensing and actuating member from the cube.

Viewfinder 18 is of a type well known to those skilled in the art and comprises a front window or objective 64 (FIG. 1), and a back window or eyepiece 65. For purposes to become more apparent hereinafter, sufficient space is provided between the front and back windows for receiving a warning or signal means such as 'amp 66.

The Multilamp Flash Unit

Figure 4:
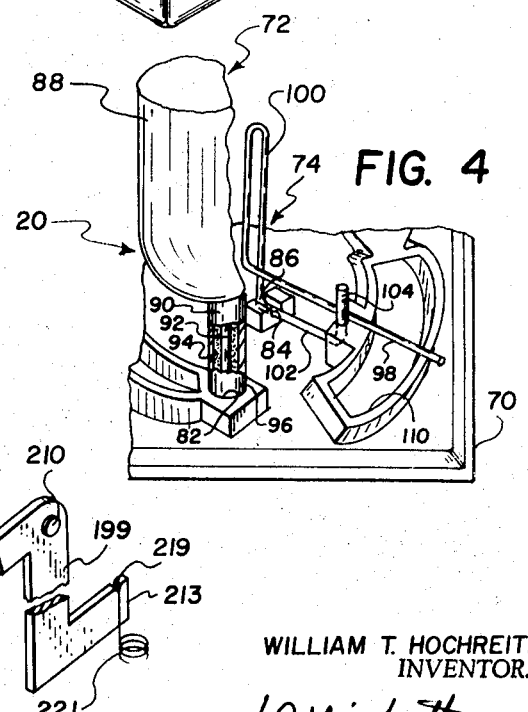
FIG. 4 is a partial perspective view of a percussively ignitable flashlamp unit with the cover removed and parts broken away to illustrate the manner in which the flashlamps and the preenergized striker wire are supported in the unit.

Referring now to FIGS. 2 and 4, and to the details of a flash device or multilamp flash unit particularly adapted for use with the present invention, a flashcube 20 is illustrated comprising a base 70 for supporting percussively ignitable flashlamps 72, a striker member or wire 74 associated with each flashlamp, reflecting means such as polished metal foil formed behind each flashlamp into concaved disks 76, a cover member of light transparent material 78, and supporting or indexing means such as post 80. In many respects, structural features of cube 20, such as the reflecting means and cover member, are somewhat similar to the presently commercial electrical cube, and will not be described in detail here. However, and while the cube per se is not a part of the present invention, a description of certain of the cube features follows for a better understanding of the present invention.

Each of the flashlamps 72 and corresponding striker wires 74 is securely supported on one side of the base, normally referred to as the upper face thereof, by means illustrated most clearly in FIG. 4 and comprising means defining a circular hold or bore 82 for receiving and supporting a portion of the flashlamp, and cut out portions or slots 84 for receiving and supporting a portion such as knee 86 of the striker wire. The upper face of base also may be provided with a stop peg or lodging member for maintaining or lodging the striker wire 74 in its preenergized condition. However, in the embodiment illustrated, the function of this lodging member is provided by a bent portion of the striker wire itself, as will be described more fully hereinafter.

Each of the four flashlamps 72 comprises a hermetically sealed envelope 88 containing combustible material such as a zerconium foil in a combustion supporting atmosphere such as oxygen. The base or lower portion of envelope 88 is formed or sealed around an elongated tube 90, of readily deformable material, having a substantially circular cross section and surrounding or containing in spaced relation therein an anvil or backup member 92. Combustion of the combustible material in the envelope is accomplished by rapidly deforming the tube with a percussive or impacting force to effect ignition of a percussively ignitable primer of material 94, such as a fulminate, coated on anvil 92 or contained in the space between tube 90 and anvil 92. Upon such ignition, the resulting heat energy deflagrates and is directed upwardly through the tube 90 and into envelope 88 to initiate combustion of the zerconium foil, or other combustible material in the envelope, to fire the flashlamp. The lower or end portion 96 of tube 90 also serves to support the envelope on the cube base and for this purpose is configured to cooperate with the circular hold or bore 82 in the base 70 for securely supporting the flashlamp on the base.

The preferred lamp impacting member or striker wire 74 also is shown most clearly in FIG. 4, and comprises an elongated or striking leg 98, an upwardly bent central portion 100 adapted to be torsionally bent or tensioned to energize the striking leg, a knee 86 defined by the central portion for engaging the cube base to locate the striking wire on the base, and a second elongated or supporting leg 102 including a bent end portion defining a stop pin or lodging element 104 for maintaining or lodging the striking leg in the tensioned position. During manufacture of the cube striker wire is positioned in a preenergized or pretensioned position in which it is maintained by lodging element 104 until the cube is fired. To permit actuation or dislodging of this striker for percussively firing the lamp, an opening or cutout portion 110 is provided in the base below the energized striking leg for receiving a camera actuating and/or sensing member, adapted to engage the wire, to first sense the operative or inoperative position of the wire, and thereafter to rapidly push the striking leg upwardly over lodging element 104 to dislodge the striking leg and fire the flashlamp. Upon such dislodging, the striking leg will be rapidly moved into engagement with tube 90, by the torsional force stored in the central portion of the striker wire, and will deform the tube and fire the lamp as described hereinabove.

The supporting or indexing means 80 (FIG. 2) extends outwardly or downwardly from the other or lower face 112 of base 70 and may be separately attached or integrally molded thereto. This means 80 comprises a channel member 114 defining a square interior opening 116 and a substantially square external surface 118. At each of the four corners of the external surface, locating means are provided comprising splines 120 each having a tapered lowered portion 122 and a substantially square upper portion 124. As will be described more fully hereinafter, in connection with a camera socket for receiving the cube, the splines 120 are guided into the socket in part by the tapered portions until they are fully seated therein, and then are held or maintained securely in their proper position relative to the socket mainly by the upper square portion 124. Also provided on the flat sides of external surface 118 and between the splines 120 are recesses or slot portions 126 having a slightly tapered or inclined lower surface 128 for cooperating with the socket latching means also to be described more fully hereinafter.

In summary, the flashcube described above supports a plurality of flashlamps and preenergized or pretensioned strikers, one associated with each flashlamp. In order to fire one of the lamps an actuating member, for example on a camera or attachment, is moved through an opening in the base and into the cube to engage and dislodge the preenergized striker from its preenergized position. The striker then will rapidly strike the tube or base of the flashlamp to percussively ignite the primer which, in turn, will deflagrate into the envelope to ignite the combustible material and fire the lamp. In the first and energized or operative position the striker wire is located over the opening in the cube base. In the second and released or inoperative position, on the other hand, the striker wire remains in contact with the lamp base or tube and is spaced from the base opening.

The Unit Receiving Socket

Figure 3:
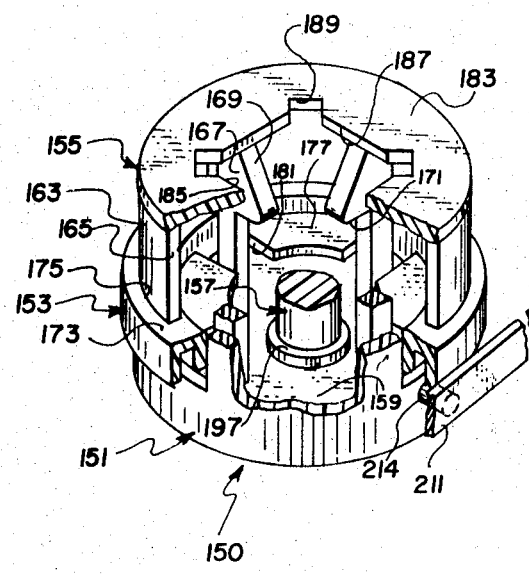
FIG. 3 is a perspective view of the socket of FIG. 2 with exterior portions of the socket broken away to illustrate the socket interior in its assembled condition.

Referring now to FIGS. 2 and 3, a preferred embodiment of a camera socket 150 is illustrated for receiving a multilamp unit or flashcube and comprises a cube supporting means or base 151, a cube-sensing member or ring 153, a cube orienting means preferably serving also as a cover member 155, and a cube stabilizing spindle or post 157.

The supporting means or base 151 comprises a base plate 159 having an opening 161 passing entirely therethrough for receiving a portion of the stabilizing spindle 157, and walls 163 extending upwardly from the outer periphery of the base plate and including means defining cut out portions or substantially rectangular slots 165 for supporting sensing ring 153. Also extending upwardly from the base, and spaced radially inwardly from the upwardly extending walls 163, are cube latching means such as resilient fingers 167, each of which includes an upper camming surface 169 to spring the fingers outwardly as the cube is inserted into the socket, and a lower camming surface 171 to maintain the cube in the socket once it is positioned therein.

The cube sensing means 153 is substantially disk shaped and includes a circular periphery or outer flange 173 including means defining openings or arcuate slots 175, configured to receive the upwardly extending walls 163 of the cube supporting means 151, and a plurality or four spaced flanges or blades 177 projecting inwardly from the outer flange to define cube contacting surfaces. Between the blades 177 are cutout portions 181 configured, as illustrated most clearly in FIG. 3, to receive the latching fingers 167.

The cube orienting means 155 comprises a disk member 183 having means defining a star opening 185 therein including a plurality of straight or flat sides 187, and cube orienting portions or square openings 189 between and at the corners of each of straight sides 187.

The cube stabilizing spindle 157 includes a threaded lower portion 191 for securing the spindle to a camera, an upper portion 193 adapted to be received within the cube indexing post 80 to prevent tilting of the cube in the socket, and a central flange 197 having an outer radius greater than the radius of base opening 161 for securing the socket to the camera with the spindle.

Referring now to the assembly of the socket, it can be seen that the cube sensing member 153 is configured and adapted to be slidably received over upwardly extending walls 163 of the cube supporting means 151. Moreover, as will be described hereinafter, the sensing means is normally maintained in an upward or raised position on the supporting means but is adapted to be pushed to a lowered or sensing position by engagement between the lower portions of cube indexing post 80 and the upper surfaces of the socket sensing blades 177 when a cube is positioned in the socket. After the sensing means is properly located on the supporting means or base, the orienting and cover member 155 is placed over the end portions of upwardly extending walls 163 and is permanently fastened thereon by glue, heat, untrasonic sealing, or other appropriate means. Once securely fastened to the base 151, the disk member serves to orient a cube received in the socket by mating with the cube splines 120 to accurately position the cube with respect to the socket. The stabilizing spindle or post 157 is now inserted through opening 161 in the base 151 and is turned to thread the stabilizing means into a cooperative threaded bore in the camera until the flange 197 thereof engages the upper surface of base 159 to securely and rotatably hold the entire socket on the camera.

Sensing and Actuating Mechanism

Figure 6:
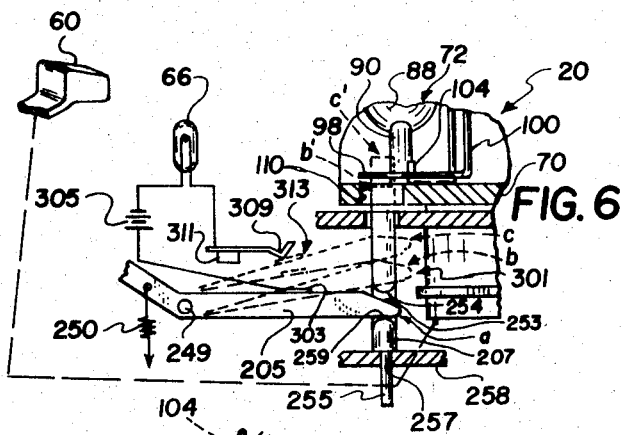
FIG. 6 is a partial schematic view of a signal or output mechanism for indicating the condition of a flashlamp in accordance with the present invention.

Referring now more particularly to the present invention, and to FIGS. 5 and 6, a mechanism for firing a percussively ignitable flashcube is illustrated generally comprising a cube sensing lever 199, a mechanism blocking or latching means 201, a movable member of slide 203, a striking member or lever 205, and a sensing and actuating probe 207.

The cube sensing lever 199 comprises a central body portion having means 210 thereon for pivotally mounting the lever on the camera or mechanism plate, and first and second end portions 211 and 213 respectively lying on opposite sides of the pivot point 209. The first end portion 211 includes a first abutment or pin 214 extending outwardly from the lever 199 to be engaged by the socket sensing ring 153 and for moving the lever 199, in response to movement of the sensing ring, either to a first inactive position or a second and sensing position, depending on whether or not a flash unit is received within the socket 150. The first or inactive position of the lever is illustrated in dotted lines in FIG. 5 and corresponds to the position of the lever prior to the positioning of a cube on the camera, while the second or sensing position is illustrated in solid line and corresponds to the lever position with a cube on the camera. Also extending outwardly from the first end portion 211 is a second abutment or lug 217 adapted to engage a portion of latching means 201 to unlatch the cube firing mechanism when a cube is received within the socket and the sensing ring 153 and sensing lever 199 are in their second or sensing positions. The second end portion 213 of lever 199 includes means such as a notch or opening 219 to which a spring 221 is coupled for normally urging the lever 199 and ring 153 toward their first or raised and inactive positions, respectively. It should be understood, however, that spring 221 is relatively weak and will not eject a properly positioned cube from the socket. While not illustrated in the preferred embodiment, lever 199 could include means accessible from the camera exterior for ejecting the lamp unit.

Latching means 201 also is pivotally mounted to the mechanism plate, for example by a pin 223, and is pivoted for movement between a first or latching position, illustrated in dotted lines on FIG. 5, and a second or release position, illustrated in solid lines on FIG. 5. A first leg or end portion 225 of the latching means includes an abutment surface 227 adapted to be engaged by the lug 217 of lever 199, while the other leg or end portion 299 includes a bent lug or extension 231 for engaging a portion of slide 203 to maintain the slide in a raised or inoperative position when the latching means is in its latching position.

In the preferred embodiment illustrated, slide 203 includes a slot 233 adapted to receive a pin 235, or other suitable means, to mount the slide 203 for longitudinal sliding movement between a raised position illustrated in FIG. 5 and a lowered position to be described more fully hereinafter in connection with firing of a flashlamp. Slide 203 includes a first lug 237, adapted to be engaged by lug 231 on the latching means 201, to latch the slide in its raised position when a cube has not been positioned on the camera, and a second lug 239, adapted to engage striking member 205 to control the position of such striking member as will be described more fully hereinafter. The lower portion of slide 203 includes a still further bent portion or lug 241 adapted to engage the control arm 29 of body release 14 to control movement of the slide between its raised and lowered positions. The slide is resiliently urged toward its lower position by a spring or other resilient member 243 attached at one end 245 to the mechanism plate or other camera portion and at its other end 247 to a portion of slide 203.

The striking lever 205 is mounted to the mechanism plate at 249 by a pin or other appropriate means permitting pivotal movement of the striking member between a first position "a" illustrated in solid line in FIG. 5, an intermediate or engaging and sensing position "b" illustrated in dotted lines on FIG. 5 and a third or signalling position "c" also illustrated in dotted lines on FIG. 5. The lever is urged in a counterclockwise direction (FIG. 5) by a spring or other resilient means 250, but movement of the lever in this counterclockwise direction is blocked and controlled or interfered with by previously mentioned lug 239 on slide 203. One end portion of the striker lever 205 is provided with an abutment surface or striking surface 251 adapted when the striker member is in its second or sensing position, to be impacted by a hammer member to effect firing of the forwardly facing flash lamp. The other end of the striker member includes a beveled force transmitting surface 253 engaging or adapted to engage the sensing and actuating probe 207 at 254 to transmit the striking force from the hammer member to the probe for effecting firing of the flashlamp. This transmitting surface 253 also effects movement of the striking probe to its fully or further raised or sensing position to be described more fully hereinafter.

The sensing and actuating probe 207 is mounted for longitudinal movement relative to the camera casing by a pin 255 received in an opening or support therefore 257 in a portion 258 of the camera body or other mounting means. This sensing or actuating probe is movable between a first lower limit or retracted position $a'$ illustrated in solid lines in FIG. 5, a second raised limit and fully or over extended position $c'$ illustrated in dotted lines in FIG. 5, and an intermediate extended and engaging or sensing position $b'$, also illustrated in dotted lines, wherein it rests against the cube striker wire for sensing the condition of the wire and effecting actuation of the wire.

Operation of Sensing and Firing Mechanism

Referring now to the operation of the flash-firing mechanism and again to FIG. 5 a flash lamp or multilamp unit, when positioned in the socket, will engage and urge the sensing means or ring member 153 to a lowered position to thereby pivot sensing lever 199 and latching means 221 in clockwise directions to unlatch the slide 203. Even after being unlatched, slide 203 is maintained in its raised position (solid lines in FIG. 5) by the control arm 29 of body release 14. However, it is urged toward its lower position by resilient means 243 and will move downwardly with the body release 14 and control arm 29 during the picture taking operation. Thus, as the body release is depressed to effect shutter actuation, it will be followed by downward movement of slide 203 which, in turn, will effect counterclockwise pivoting of striker lever 205, and raising of sensing probe 207 to either of their two dotted line positions shown in FIG. 5. As will become more apparent hereinafter this striker member and probe will assume a selected one of the two dotted line positions depending upon whether the flashlamp in the firing position is operative or inoperative: positions ($b$ and $b'$) representing an operative flash lamp and positions ($c$ and $c'$) representing an inoperative flashlamp.

Assuming now that the flashlamp in the firing position is operative, the sensing and actuating probe 207 will be moved upwardly out of the camera casing, through cube opening 110, and into the cube to engage its preenergized striker wire 100. Spring 250 of the striker lever 205 is selected to have sufficient force to rotate the lever but insufficient force to dislodge the cube striker wire from its energized position. If the forwardly facing flashlamp were inoperative, on the other hand, due for example to prior firing, the sensing lever 205 and probe 207 would move to their limit positions $c$ and $c'$ (dotted lines in FIG. 5) and, as will be described more fully hereinafter in connection with FIG. 6, a signal could be energized to indicate in the camera viewfinder that the forwardly facing lamp is inoperative.

Now upon further depression of body release 14, and again assuming an operative flashlamp, latching member 38 will release the hammer member to effect opening of the shutter as described hereinabove. Moreover, since the striking surface 251 of striker lever 205 will be in its second position "$b$," it will be abruptly struck or impacted by the hammer member and will be rapidly driven thereby in a counterclockwise direction. This rapid movement will, in turn, be transmitted or translated by surface 253 to the sensing probe 257, and will rapidly force the cube striker member upwardly over its stop to release the energy in the striker wire and effect firing of the forwardly facing flashlamp. Synchronization of shutter actuation with flashlamp firing is built into the mechanism by effecting both shutter actuation and cube firing upon the sweep of the single hammer member 205.

After full depression of body release 14, and after the forwardly facing flashlamp has been fired and the film exposed, the body release is returned to its initial raised position by spring 32. Simultaneous with such return, hammer latch 38 is returned to its counterclockwise hammer latching position by spring 40; the hammer is returned to its first set or latched position by pin 34 and under the action of spring 32; slide 203 is returned to its raised position by arm 29 and under the action of spring 32 (the same being stronger than and overcoming both slides spring 243 and striker-lever spring 250); the striker lever 205 is returned to its clockwise or retracted position by slides 203 and under the action of spring 32; and the sensing member or probe 207 is positively withdrawn from the cube, and to its retracted position, by engagement between the lever and the probe at 259 and again under the action of spring 32. Since all of these mechanisms are returned and reset or cocked by or upon return of the body release, it is not necessary to accomplish the same through the film winding or cube indexing mechanisms and these latter mechanisms can be simplified as well as more easily operated.

Still further, the driver or hammer spring 46 is tensioned only while the body release is being depressed, and is substantially relaxed after release of the driver and upon and after return of the body release. This reduces the force necessary both to depress the body release during the initial stage thereof and to return the body release to its raised position.

It now should also be apparent that, with a cube on the camera, the various springs 32, 46, 243, and 250 balance each other, to some extent, and thereby reduce the force, or at least permit operation with substantially the same force that otherwise would be necessary to depress the body release. For example, the slides and striker-lever springs 245 and 250 cooperate to aid in urging the body release toward its depressed position and against the return force of body release spring 32.

Also after firing of the flashlamp at the forwardly facing position or firing location, or if it is found before firing that such flashlamp is inoperative, the flashlamp can be indexed to locate the next or another respective one of the flashlamps at the firing location. This indexing can be effected by rotating the socket and/or cube either manually, or automatically in response to film winding, for example, by a mechanism represented schematically in FIG. 6 and disclosed more fully in commonly assigned concurrently filed U.S. application, Ser. No. 850,125 filed in the name of Edward L. Sturm. Similarly the shutter and its operating mechanism can be cocked or reset, for example, by a mechanism such as that used in the Kodak Instamatic 814 camera.

Referring now to FIG. 6 a mechanism 301 is illustrated for generating a signal in the viewfinder indicative of the condition of the forwardly facing flashlamp. In this mechanism the striker lever 205 includes an electrical contact 303 forming part of a warning lamp circuit comprising, for example, a source of electrical energy 305, the warning lamp 66, and a second electrical contact 309 cooperating with the first contact 303 to define a switch 313. Contact 309 is positioned on the camera body, for example at 311, and is positioned such that it will be engaged by contact 303 only when the sensing and actuating probe 207 is moved to the limit position "c'" assumed when the flash lamp in the firing position is inoperative. Thus, if the flash lamp already has been fired, its striker wire will not be positioned over opening 110, and initial depression of the body release will move the sensing and actuating probe 207 to this limit position "c'," thereby energizing the warning circuit and lamp 307. On the other hand, when the lamp is operative the sensing probe will engage and be stopped by the striker wire in the cube before the contacts of switch 313 are closed, and the warning signal will not be energized. Of course, it will be apparent to those skilled in the art that warning lamp 307 can be positioned within the viewfinder or it could be positioned elsewhere in the camera. Moreover, other means such as a light pipe or reflecting means could be used to transmit a light signal in a manner making it visible in the viewfinder, or other appropriate place, to warn the camera operator of the cube condition.

While not shown in the preferred embodiment, it would also be possible to provide the camera with a blocking mechanism, as illustrated in commonly assigned U.S. Pat. application, Ser. No. 767,145, for preventing further operation of the body release to take a picture in the event an inoperative flashcube is sensed by the sensing and actuating probe 207.

Figure 7A:
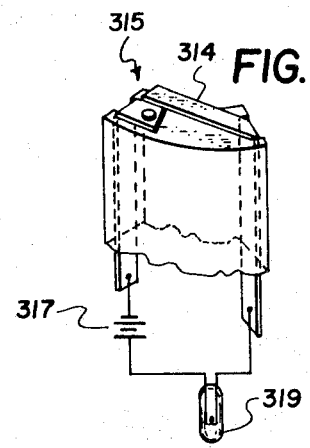
FIGS. 7A and 7B are partial schematic views of a second signal or output means for effecting a signal when a flashcube on the camera is in proper condition for operation.
Figure 7B:
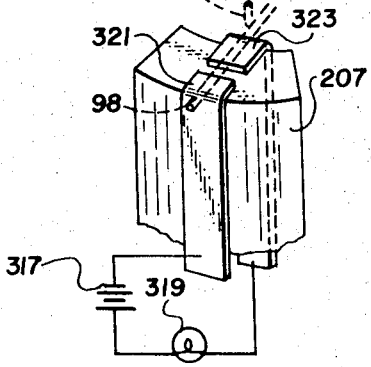

Although not a part of the preferred embodiment, other signal circuits are illustrated in FIGS. 7A and B, also for indicating the condition of the forwardly facing flashlamp. However, in these circuits an indication is generated only when the flashlamp is in an operative condition, as distinguished from the inoperative signal effected by the circuit of FIG. 6. In FIG. 7A the sensing or actuating probe 207 is electrically nonconductive and includes first and second electrical contacts 314 and 315 arranged to provide a normally open switch 316 in a circuit including a source of electrical energy or battery 317 and a signal lamp 319. The resiliency of contact 314 normally will maintain the switch 316 in an opened condition unless and until the first contact 314 engages an operative striker wire in the flashcube. Upon such engagement the upward force of the sensing and actuating probe 207 will urge the resilient contact 314 downwardly into engagement with the second contact 315 to energize the signal circuit and lamp 319. If the forwardly facing flashlamp is inoperative however, the striker wire will not be in a position to be engaged by the sensing and actuating probe 207 and therefore it will not effect closing of the first and second contacts 314 and 315. Thus, the signal lamp 319 will not be energized and no signal will be generated. As in the embodiment illustrated in FIG. 6, the signal lamp 319 is positioned in a manner to be visible in the viewfinder, or some other appropriate place, to indicate to the camera operator that the forwardly facing flash lamp is operative. Of course, the warning signals of FIG. 6 and FIG. 7A could be used together: the first signal of FIG. 6 indicating when the lamp is inoperative, and the second signal of FIG. 7A energizing a flash ready signal. Moreover, as illustrated in FIG. 7B, the switch could be defined by spaced contacts 321 and 323 to be closed by the conductivity of the striker wire itself, rather than by direct contact between the contacts.

It now should be apparent, from the above description and to those skilled in the art, that a sensing and mechanical flash firing mechanism has been provided having particular advantages not available in prior art mechanisms. More specifically, and by way of example only, the mechanism is fireable, and resetable after firing, without substantially increasing the force necessary to effect film winding and/or depression of the body release. Moreover, the mechanism may be of the preferred type disclosed, wherein the actuating member has a retracted position, protected by the camera housing, is movable relatively slowly to a first distinct position adapted to nonreleasably engage with the cube striker wire is movable more rapidly to a second extended position for releasing or dislodging the striker wire, and is then returnable to the retracted position permitting indexing of the flashlamps. Still further the mechanism may include means for sensing and indicating the operative or inoperative condition of the flashlamps. Of course, other advantages will be apparent from the above description and to those skilled in the art.

The invention has been described in detail with particular reference to preferred embodiments thereof, but it will be understood that variations and modifications can be effected within the spirit and scope of the invention.

I claim:

1. A photographic camera for mechanically firing a flash device to effect the exposure of film in the camera by actinic light originating at the flash device; the camera comprising:
    a shutter operative to expose film in the camera to actinic light from the flash device;
    a camera operating element manually movable from a first position to a second position, and thereafter automatically returnable to the first position;
    flash firing means including an actuating member drivable against the flash device to fire the device, and a driver having a latched position from which the driver is releasable to drive the member against the flash device to fire the flash device;
    means responsive to movement of said operating element to its second position for synchronously operating the shutter and releasing the driver, to fire the flash device and to expose film in the camera to actinic light originating at the flash device; and
    a resetting mechanism, responsive to return of the operating element to its first position, for returning said driver to its latched position and for resetting said flash firing means.

2. A photographic camera as claimed in claim 1 wherein said driver, upon being released by movement of said operating element, effects both operation of said shutter and firing of the flash device.

3. A photographic camera for exposing film and usable with percussively firable flash devices, a plurality of such devices being simultaneously receivable for indexing on the camera to locate respective ones of the received devices at a predetermined firing position; the camera comprising:
- a shutter actuating element movable between first and second positions, the element being movable to its second position for effecting the exposure of film in the camera and thereafter being returnable to its first position;
- a flash actuator movable between an indexing position, wherein the actuator will be displaced from flash devices received on the camera, and an extended position for engaging a flash device at the firing position;
- means for driving said actuator when said actuator is in its extended position, said driving means having a latched position in which it is energizable and from which it is releasable to drive the actuator against an engaged flash device to fire the device;
- means responsive to movement of the shutter actuating element to its second position for moving said actuator toward its extended position to engage a flash device, and for releasing said driving means to fire the engaged flashlamp; and
- means responsive to return of the element to its first position for effecting movement of said actuator to its retracted position and of said driving means to its latched position, thereby permitting indexing of another respective flash device to the firing position and setting said actuator and driving means to fire such another device.

4. A photographic camera for exposing film and usable with percussively firable flash devices supported in a multilamp unit; the unit being removably receivable on the camera and indexable relative to the camera to locate respective ones of the devices at a firing position; the camera comprising:
- a shutter actuating element movable between a rest position and an actuating position for effecting the exposure of film in the camera to light from a respective flash device;
- a flash actuating member movable between a retracted position, wherein the member will be withdrawn from a multilamp unit receivable on the camera, and first and second extended positions respectively, for engaging a flash device on the camera and for effecting firing of the flash device; and
- means coupling said shutter actuating element to said flash actuating member, said means including means for:
  - first moving said actuating member to its first extended position to engage a flash device;
  - thereafter effecting movement of said actuating member to its second extended position to fire the flash device; and,
  - thereafter returning said actuating member to its retracted position;
- said coupling means moving said actuating member to its first and second extended positions in response to movement of the shutter actuating element to its actuating position, and moving said actuating member to its retracted position in response to return movement of the element to its rest position.

5. A camera mechanism for sensing the condition of a percussively ignitable flash device; the device including a flashlamp, and a striker wire, the striker wire having an energized position spaced from the flashlamp and a released position in engagement with the flashlamp; the camera including a casing and a mechanical sensing member, the sensing member being movable to a first extended position spaced outwardly from the casing for engaging and sensing a striker wire in the energized position and a second extended position spaced outwardly from the casing further than the first position for sensing the absence of a striker wire in the energized position, the mechanism comprising:
- electrically energizable means for indicating the respective energized or released position of the striker wire in a flash device on the camera, said means including a flash-ready lamp in circuit with a source of electrical energy and switching means, said switching means having a pair of normally open contacts closeable when the sensing member is in its first extended position and only when the member engaged an energized striker wire in such position, thereby coupling said lamp to said energy source to energize said lamp and to effect a signal indicative of a striker wire in the energized position of the wire.

6. A camera mechanism for sensing the condition of a percussively ignitable flash device; the device including a flashlamp and a striker wire, the wire having an energized position spaced from the flashlamp and a released position in engagement with the flashlamp; the camera including a casing and a mechanical sensing member, the member being movable to a first extended position spaced outwardly from the casing for engaging and sensing a striker wire in the energized position and a second extended position spaced outwardly from the casing further than the first position for sensing the absence of a striker wire in the energized position; the mechanism comprising:
- means for indicating the presence of an energized striker in a flash device on the camera, said means including a lamp in circuit with a normally open switch, said switch having a pair of spaced contacts adapted to be electrically bridged by the flashlamp striker to close the switch and energize the lamp only when the sensing member engages an energized striker.

7. For use with a flashlamp unit of the type having at least one flashlamp fireable by striking and a striker for each lamp held in a preenergized position from which it is releasable to fire its lamp, the striker having an electrically conductive portion, photographic apparatus comprising:
- means for receiving such a flashlamp unit and for orienting a received unit with the electrically conductive portion of a preenergized striker located at a predetermined position relative to said receiving means;
- a sensing member having a pair of spaced electrical contacts electrically connectable by the conductive portion of a striker at said predetermined position; and
- electrically energizeable circuit means connected to said contacts, said circuit means including electrical indicating means responsive to electrical connection of said contacts by the conductive portion of a preenergized striker to indicate the presence or absence of a striker in its preenergized position.

* * * * *